(12) United States Patent
Hanley

(10) Patent No.: US 10,899,950 B2
(45) Date of Patent: Jan. 26, 2021

(54) ONE-COMPONENT THERMOSETTING EPOXY ADHESIVE WITH IMPROVED ADHESION

(71) Applicant: SIKA TECHNOLOGY AG, Baar (CH)

(72) Inventor: John Hanley, Sterling Heights, MI (US)

(73) Assignee: SIKA TECHNOLOGY AG, Baar (CH)

( * ) Notice: Subject to any disclaimer, the term of this patent is extended or adjusted under 35 U.S.C. 154(b) by 140 days.

(21) Appl. No.: 16/140,921

(22) Filed: Sep. 25, 2018

(65) Prior Publication Data

US 2019/0092987 A1    Mar. 28, 2019

(30) Foreign Application Priority Data

Sep. 25, 2017    (EP) .................................. 17192900

(51) Int. Cl.
| | |
|---|---|
| *C09J 163/00* | (2006.01) |
| *C08G 59/40* | (2006.01) |
| *C08G 59/42* | (2006.01) |
| *B32B 7/12* | (2006.01) |
| *B32B 15/01* | (2006.01) |
| *C09J 5/06* | (2006.01) |
| *C09J 11/06* | (2006.01) |

(52) U.S. Cl.
CPC .............. *C09J 163/00* (2013.01); *B32B 7/12* (2013.01); *B32B 15/011* (2013.01); *B32B 15/016* (2013.01); *C08G 59/4021* (2013.01); *C08G 59/42* (2013.01); *C09J 5/06* (2013.01); *C09J 11/06* (2013.01); *C09J 2463/00* (2013.01)

(58) Field of Classification Search
CPC ...................................................... C09J 163/00
See application file for complete search history.

(56) References Cited

U.S. PATENT DOCUMENTS

| | | | |
|---|---|---|---|
| 6,387,470 B1 * | 5/2002 | Chang ..................... | B60R 13/08 428/121 |
| 2012/0041101 A1 * | 2/2012 | Spyrou ................ | C08G 59/686 523/400 |
| 2013/0022818 A1 * | 1/2013 | Ito ............................ | C08K 3/00 428/414 |
| 2019/0055439 A1 * | 2/2019 | Gutgsell ................ | C08G 59/42 |

FOREIGN PATENT DOCUMENTS

| | | |
|---|---|---|
| WO | 2010/124901 A1 | 11/2010 |
| WO | 2017/030988 A1 | 2/2017 |
| WO | 2017/121826 A1 | 7/2017 |

OTHER PUBLICATIONS

Mar. 13, 2018 Search Report and Written Opinion issued in European Patent Application No. 17192900.3.

* cited by examiner

*Primary Examiner* — Daniel H Lee
(74) *Attorney, Agent, or Firm* — Oliff PLC

(57) ABSTRACT

A one-component thermosetting epoxy resin adhesive, including a) at least one epoxy resin A having on average more than one epoxide group per molecule; b) at least one latent hardener for epoxy resins; and c) at least one carboxylic acid selected from substituted or unsubstituted succinic acid and substituted or unsubstituted phthalic acid, wherein the epoxy resin adhesive contains 1.7 to 15 mmol of the at least one carboxylic acid per 100 g of epoxy resin adhesive, and the epoxy resin adhesive has a viscosity of more than 10 000 Pas at 25° C.

16 Claims, No Drawings

ONE-COMPONENT THERMOSETTING EPOXY ADHESIVE WITH IMPROVED ADHESION

TECHNICAL FIELD

The present invention pertains to the field of one-component thermosetting epoxy resin adhesives and also to the use thereof particularly in vehicle construction and sandwich panel construction.

PRIOR ART

Thermosetting, one-component epoxy resin adhesives have already been used for some considerable time as adhesives in body construction and also in reinforcing elements and/or structural foams.

One important field of use of one-component thermosetting epoxy resin adhesives, accordingly, is in vehicle construction, where typically there are metal substrates such as steel sheets and aluminium present, particularly in the context of adhesive bonding or of the foam-filling of cavities in body construction. In both cases, following the application of the epoxy resin composition, the bodywork is heated in the CEC (cathodic electrocoating) oven, by means of which the thermosetting epoxy resin composition as well is cured and, where appropriate, foamed.

Reinforcing elements comprising a one-component thermosetting epoxy resin composition which on exposure to heat forms a structural foam are known by the tradename SikaReinforcer®, for example. U.S. Pat. No. 6,387,470 B1 discloses, for example, a thermosetting, foamable sealant which comprises epoxy resins in the presence of a thermoplastic such as polystyrene and of a thermoplastic elastomer such as SBS block copolymer.

In the case of the aforementioned metal substrates such as steel sheets, especially oiled steel sheets, and aluminium, however, the adhesion of the one-component thermosetting epoxy resin compositions is often inadequate.

SUMMARY OF THE INVENTION

It is an object of the present invention, therefore, to provide a one-component thermosetting epoxy resin adhesive which is solid preferably at room temperature and which improves the adhesion of the cured adhesive on specific metal substrates, especially metal substrates of steel and aluminium, without any need for pretreatment of the metal substrate prior to bonding. The intention in particular is to achieve improved tensile shear strength. Likewise preferably avoided should be sharp changes in colour of the cured epoxy resin adhesive as a result of the curing process.

Surprisingly it has been found that this object can be achieved in particular through the use of relatively small amounts of particular carboxylic acids in an epoxy resin adhesive according to the present invention, more particularly in an epoxy resin adhesive which is solid preferably at 25° C. in accordance with the present invention. The invention therefore relates to the one-component thermosetting epoxy resin adhesive as defined in claim 1.

By admixing the carboxylic acid into the adhesive it is possible to achieve significant improvement in the adhesion to specific metal substrates such as steel and aluminium. The adhesion achieved is, in particular, robust towards heat.

The admixing of acids into these systems is generally unusual, the assumption having been that the properties of the adhesive would be adversely affected through reaction of the acid with adhesive components, something which—surprisingly—did not occur, however.

Another effect observed with certain carboxylic acids is local brown discoloration. The assumption is that the local exotherm plays a part in this phenomenon.

Further aspects of the invention are subjects of further independent claims. Particularly preferred embodiments of the invention are subjects of the dependent claims.

Certain Embodiments of the Invention

The present invention therefore relates to a one-component thermosetting epoxy resin adhesive, comprising a) at least one epoxy resin A having on average more than one epoxide group per molecule;

b) at least one latent hardener for epoxy resins; and c) at least one carboxylic acid selected from substituted or unsubstituted succinic acid and substituted or unsubstituted phthalic acid.

The epoxy resin adhesive contains 1.7 to 15 mmol of the at least one carboxylic acid per 100 g of epoxy resin adhesive. The epoxy resin adhesive further has a viscosity of more than 10 000 Pas at 25° C., the viscosity being determined oscillographically by means of a rheometer with heatable plate (MCR 301, AntonPaar) (gap 1000 µm, measuring plate diameter: 25 mm (plate/plate), deformation 0.01 at 5 Hz, temperature: 25° C.).

The epoxy resin adhesive is one-component, meaning that the constituents of the epoxy resin adhesive, more particularly the epoxy resin and the hardener, are present in one component, without curing taking place at usual ambient temperature or room temperature. The one-component epoxy resin adhesive is therefore storage-stable. It can therefore be handled in this form, whereas with two-component systems the components cannot be mixed until immediately prior to use.

The curing of the one-component epoxy resin adhesive is accomplished by heating, typically at a temperature of more than 70° C., as in the range from 100 to 220° C., for example.

The prefix "poly" in expressions such as polyol or polyisocyanate denotes that the compound has two or more of the stated groups. A polyisocyanate, for example, is a compound having two or more isocyanate groups.

The expression "independently of one another" as used below means that in the same molecule, two or more identically denoted substituents may have identical or different meanings in accordance with the definition.

The dashed lines in the formulae in this document represent in each case the bond between the substituent in question and the associated remainder of the molecule.

Room temperature refers here to a temperature of 23° C., unless otherwise indicated.

The thermosetting one-component epoxy resin adhesive comprises at least one epoxy resin A having on average more than one epoxide group per molecule. The epoxide group is preferably in the form of a glycidyl ether group.

The fraction of the epoxy resin A having on average more than one epoxide group per molecule is preferably from 25-70 wt %, 25-60 wt %, 30-55 wt %, 30-50 wt %, more preferably 30-45 wt %, based on the total weight of the one-component thermosetting epoxy resin adhesive.

The epoxy resin A having on average more than one epoxide group per molecule is preferably a liquid epoxy resin or a solid epoxy resin. The term "solid epoxy resin" is very familiar to the person skilled in the epoxide art and is used in contrast to "liquid epoxy resins". The glass transition temperature of solid resins is above room temperature, meaning that at room temperature they can be comminuted into pourable powders.

Preferred epoxy resins have the formula (II)

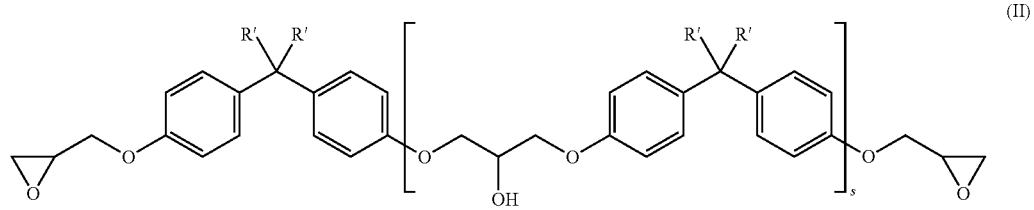

In this formula, the substituents R' and R" independently of one another are either H or $CH_3$.

In solid epoxy resins, the index s has a value of >1.5, more particularly from 2 to 12.

Solid epoxy resins of this kind are available commercially, for example, from Dow or Huntsman or Hexion.

Compounds of the formula (II) having an index s of 1 to 1.5 are referred to by the person skilled in the art as semi-solid epoxy resins. For the purposes of the present invention, they are considered likewise to be solid resins. Preferred solid epoxy resins, however, are epoxy resins in the narrower sense, in other words where the index s has a value of >1.5.

In the case of liquid epoxy resins, the index s has a value of less than 1. Preferably s has a value of less than 0.2.

The resins in question are therefore preferably diglycidyl ethers of bisphenol A (DGEBA), of bisphenol F and also of bisphenol A/F. Liquid resins of these kinds are available for example as Araldite® GY 250, Araldite® PY 304, Araldite® GY 282 (Huntsman) or D.E.R.™ 331 or D.E.R.™ 330 (Dow) or Epikote 828 (Hexion).

Of further suitability as epoxy resin A are what are called epoxy novolacs. These compounds have, in particular, the following formula:

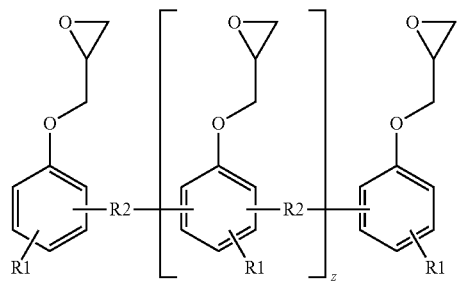

where

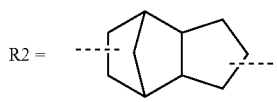

or $CH_2$, R1=H or methyl and z=0 to 7.

More particularly these are phenol-epoxy or cresol-epoxy novolacs (R2=$CH_2$).

Epoxy resins of these kinds are available commercially under the tradename EPN or ECN and also Tactix® from Huntsman, or within the product series D.E.N.™ from Dow Chemical.

The epoxy resin A is preferably a liquid epoxy resin of the formula (II).

In one particularly preferred embodiment, the thermosetting epoxy resin composition comprises not only at least one liquid epoxy resin of the formula (II) with s<1, more particularly less than 0.2, but also at least one solid epoxy resin of the formula (II) with s>1.5, more particularly from 2 to 12.

It is advantageous, moreover, if the fraction of the aforesaid liquid epoxy resin is from 5-40 wt %, 10-35 wt %, 15-35 wt %, more preferably 20-30 wt %, based on the total weight of the one-component thermosetting epoxy resin adhesive.

It is advantageous, moreover, if the fraction of the aforesaid solid epoxy resin is from 5-30 wt %, 5-25 wt %, 5-20 wt %, more preferably 10-15 wt %, based on the total weight of the one-component thermosetting epoxy resin adhesive.

The thermosetting one-component epoxy resin adhesive further comprises at least one latent hardener for epoxy resins. Latent hardeners are substantially inert at room temperature and are activated by elevated temperature, typically at temperatures of 70° C. or more, thereby initiating the curing reaction. The customary latent hardeners for epoxy resins can be used. Preference is given to a latent epoxy resin hardener containing nitrogen.

The latent hardener is preferably selected from dicyandiamide, guanamines, guanidines, aminoguanidines and derivatives thereof, substituted ureas, imidazoles and amine complexes, preferably dicyandiamide.

The fraction of the latent hardener is preferably 0.5 to 12 wt %, more preferably 1 to 8 wt %, more particularly 2-6 wt %, based on the total weight of the epoxy resin adhesive.

The thermosetting one-component epoxy resin adhesive further comprises at least one carboxylic acid selected from substituted or unsubstituted succinic acid and substituted or unsubstituted phthalic acid.

The stated carboxylic acids may be unsubstituted or substituted, preference being given to the unsubstituted carboxylic acids.

In the case of the stated substituted carboxylic acids, one or more hydrogen atoms bonded to carbon atoms may be replaced by substituents, and the substituents may be identical or different if two or more substituents are present. The substituted carboxylic acids preferably have one or two substituents.

Examples of suitable substituents are alkyl, e.g. $C_1$-$C_6$ alkyl, cycloalkyl, e.g. $C_3$-$C_6$ cycloalkyl, aryl, e.g. phenyl, aralkyl, e.g. $C_1$-$C_3$ alkyl substituted by a phenyl group, aralalkyl, e.g. phenyl substituted by one or more $C_1$-$C_4$ alkyl groups, alkyloxy, e.g. $C_1$-$C_6$ alkoxy, aryloxy, e.g. phenoxy, aralkyloxy, hydroxyl, nitro, oxo (=O), mercapto, phenol and halogen.

The at least one carboxylic acid is preferably selected from succinic acid and phthalic anhydride. The carboxylic acid used is preferably anhydrous carboxylic acid without water of hydration.

Where the carboxylic acid is succinic acid, this is of advantage in that particularly high tensile shear strength values are obtained.

Where the carboxylic acid is phthalic anhydride, this is of advantage in that there is no brown discoloration formed on the cured epoxy resin adhesive.

The epoxy resin adhesive contains 1.7 to 15 mmol of the at least one carboxylic acid per 100 g of epoxy resin adhesive. Preferably, the epoxy resin adhesive contains 2 to 13 mmol, 2.5 to 10.5 mmol, 2.5 to 8.5 mmol, 2.5 to 6 mmol, more preferably 3 to 5 mmol, of the at least one carboxylic acid per 100 g of epoxy resin adhesive. This is beneficial to an improved tensile shear strength and also a cohesive fracture pattern, more particularly at curing temperatures of 170-205° C., as is evident in Table 1, for example. Moreover, in the case of succinic acid as the carboxylic acid, the preferred ranges lead to a reduction in the brown discoloration on the cured epoxy resin adhesive.

The one-component thermosetting epoxy resin adhesive preferably comprises at least one toughness improver D. The toughness improvers D may be solid or liquid.

More particularly the toughness improver D is selected from the group consisting of terminally blocked polyurethane polymers D1, liquid rubbers D2 and core-shell polymers D3. With preference the toughness improver D is selected from the group consisting of terminally blocked polyurethane polymers D1 and liquid rubbers D2.

Where the toughness improver D is a terminally blocked polyurethane polymer D1, it is preferably a terminally blocked polyurethane prepolymer of the formula (I).

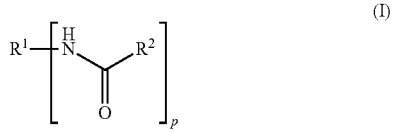

In this formula, $R^1$ is a p-valent radical of a linear or branched polyurethane prepolymer terminated by isocyanate groups, following the removal of the terminal isocyanate groups, and p has a value of 2 to 8.

Moreover, $R^2$ independently at each occurrence is a substituent which is selected from the group consisting of

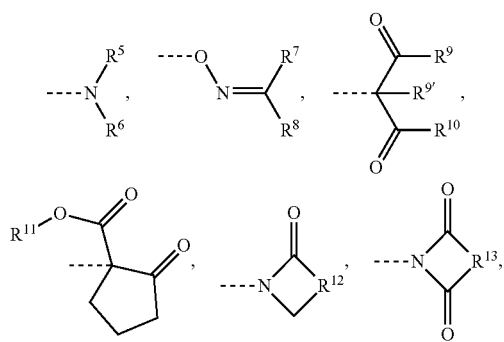

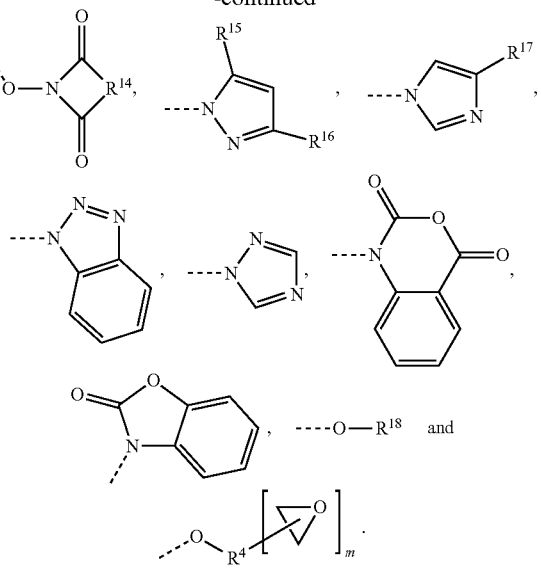

In these formulae, $R^5$, $R^6$, $R^7$ and $R^8$ each independently of one another are an alkyl or cycloalkyl or aralkyl or arylalkyl group, or $R^5$ together with $R^6$, or $R^7$ together with $R^8$, forms part of a 4- to 7-membered ring which is optionally substituted.

Moreover, $R^{9'}$ and $R^{10}$ each independently of one another are an alkyl or aralkyl or arylalkyl group or are an alkyloxy or aryloxy or aralkyloxy group, and $R^{11}$ is an alkyl group.

$R^{12}$, $R^{13}$ and $R^{14}$ each independently of one another are an alkylene group having 2 to 5 carbon atoms, which optionally has double bonds or is substituted, or are a phenylene group or are a hydrogenated phenylene group.

$R^{15}$, $R^{16}$ and $R^{17}$ each independently of one another are H or are an alkyl group or are an aryl group or an aralkyl group, and $R^{18}$ is an aralkyl group or is a mono- or polycyclic, substituted or unsubstituted aromatic group which optionally has aromatic hydroxyl groups.

Lastly, $R^4$ is a radical of an aliphatic, cycloaliphatic, aromatic or araliphatic epoxide containing a primary or secondary hydroxyl group, after the removal of the hydroxyl and epoxide groups, and m has a value of 1, 2 or 3.

$R^{18}$ should be considered to comprise, in particular, on the one hand, phenols or polyphenols, more particularly bisphenols, after removal of a hydroxyl group. Preferred examples of such phenols and bisphenols are, in particular, phenol, cresol, resorcinol, pyrocatechol, cardanol (3-pentadecenylphenol (from cashew nut shell oil)), nonylphenol, phenols reacted with styrene or with dicyclopentadiene, bisphenol A, bisphenol F and 2,2'-diallylbisphenol A. $R^{18}$ should be considered on the other hand to comprise, in particular, hydroxybenzyl alcohol and benzyl alcohol after removal of a hydroxyl group.

If $R^5$, $R^6$, $R^7$, $R^8$, $R^9$, $R^{9'}$, $R^{10}$, $R^{11}$, $R^{15}$, $R^{16}$ or $R^{17}$ is an alkyl group, this group more particularly is a linear or branched $C_1$-$C_{20}$ alkyl group.

If $R^5$, $R^6$, $R^7$, $R^8$, $R^9$, $R^{9'}$, $R^{10}$, $R^{15}$, $R^{16}$, $R^{17}$ or $R^{18}$ is an aralkyl group, this moiety is more particularly an aromatic group bonded via methylene, more particularly a benzyl group.

If $R^5$, $R^6$, $R^7$, $R^8$, $R^9$, $R^{9'}$ or $R^{10}$ is an alkylaryl group, this group is more particularly $C_1$ to $C_{20}$ alkyl group bonded via phenylene, such as tolyl or xylyl, for example.

The radicals $R^2$ are preferably the substituents of the formulae

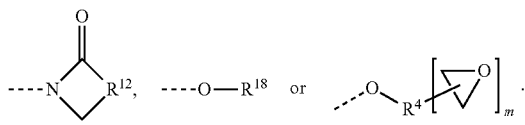

A preferred substituent of the formula

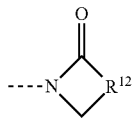

is ε-caprolactam after removal of the NH proton.

Preferred substituents of the formula —O—$R^{18}$ are monophenols or polyphenols, more particularly bisphenols, after removal of a phenolic hydrogen atom. Particularly preferred examples of such radicals $R^2$ are radicals which are selected from the group consisting of

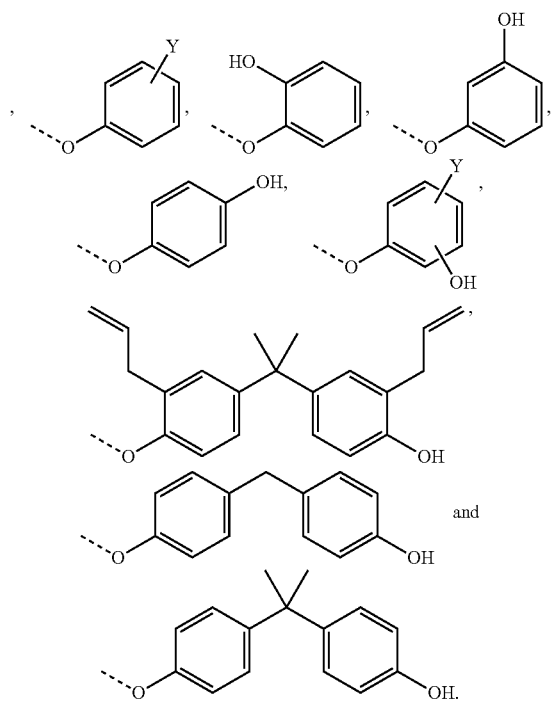

The radical Y in these formulae is a saturated, aromatic or olefinically unsaturated hydrocarbyl radical having 1 to 20 carbon atoms, more particularly having 1 to 15 carbon atoms. Preferred as Y are, in particular, allyl, methyl, nonyl, dodecyl, phenyl, alkyl ether, carboxylic ester or an unsaturated $C_{15}$ alkyl radical having 1 to 3 double bonds.

Most preferably $R^2$ is —O—$R^{18}$.

The terminally blocked polyurethane prepolymer of the formula (I) is prepared from the linear or branched polyurethane prepolymer, terminated by isocyanate groups, with one or more isocyanate-reactive compounds $R^2H$. If two or more such isocyanate-reactive compounds are used, the reaction may take place sequentially or with a mixture of these compounds.

The reaction preferably takes place such that the one or more isocyanate-reactive compounds $R^2H$ are used stoichiometrically or in a stoichiometric excess, in order to ensure that all of the NCO groups have undergone reaction.

The polyurethane prepolymer having isocyanate end groups on which $R^1$ is based may be prepared from at least one diisocyanate or triisocyanate and also from a polymer $Q_{PM}$ having terminal amino, thiol or hydroxyl groups and/or from an optionally substituted polyphenol $Q_{PP}$.

Suitable diisocyanates are aliphatic, cycloaliphatic, aromatic or araliphatic diisocyanates, especially commercial products such as methylenediphenyl diisocyanate (MDI), hexamethylene diisocyanate (HDI), toluene diisocyanate (TDI), tolidine diisocyanate (TODI), isophorone diisocyanate (IPDI), trimethylhexamethylene diisocyanate (TMDI), 2,5- or 2,6-bis(isocyanatomethyl)bicycol[2.2.1]heptane, naphthalene 1,5-diisocyanate (NDI), dicyclohexylmethyl diisocyanate ($H_{12}$MDI), p-phenylene diisocyanate (PPDI), m-tetramethylxylylene diisocyanate (TMXDI), etc., and also their dimers. Preferred are HDI, IPDI, MDI or TDI.

Suitable triisocyanates are trimers or biurets of aliphatic, cycloaliphatic, aromatic or araliphatic diisocyanates, more particularly the isocyanurates and biurets of the diisocyanates described in the preceding paragraph. It is of course also possible to use suitable mixtures of di- or triisocyanates.

Particularly suitable as polymers $Q_{PM}$ having terminal amino, thiol or hydroxyl groups are polymers $Q_{PM}$ having two or three terminal amino, thiol or hydroxyl groups.

The polymers $Q_{PM}$ advantageously have an equivalent weight of 300-6000, more particularly of 600-4000, preferably of 700-2200 g/equivalent of NCO-reactive groups.

Preferred polymers $Q_{PM}$ are polyols having average molecular weights of between 600 and 6000 daltons, selected from the group consisting of polyethylene glycols, polypropylene glycols, polyethylene glycol-polypropylene glycol block polymers, polybutylene glycols, hydroxyl-terminated polybutadienes, hydroxyl-terminated butadiene-acrylonitrile copolymers, and mixtures thereof.

Especially preferred as polymers $Q_{PM}$ are α,ω-dihydroxypolyalkylene glycols having $C_2$-$C_6$ alkylene groups or having mixed $C_2$-$C_6$ alkylene groups, which are terminated with amino, thiol or, preferably, hydroxyl groups. Particularly preferred are polypropylene glycols or polybutylene glycols. Further particularly preferred are hydroxyl-group-terminated polyoxybutylenes.

Especially suitable as polyphenol $Q_{PP}$ are bis-, tris- and tetraphenols. The term refers not only to pure phenols, but instead also, where appropriate, to substituted phenols. The nature of the substitution can be very diverse. Understood more particularly by this is substitution directly on the aromatic ring system to which the phenolic OH group is bonded. Phenols, moreover, are not only monocyclic aromatics, but also polycyclic or fused aromatic or heteroaromatics, having the phenolic OH group directly on the aromatic or heteroaromatic moiety.

In one preferred embodiment, the polyurethane prepolymer is prepared from at least one diisocyanate or triisocyanate and also from one polymer $Q_{PM}$ having terminal amino, thiol or hydroxyl groups. The polyurethane prepolymer is prepared in a manner known to the person skilled in the polyurethane art, more particularly by using the diisocyanate or triisocyanate in a stoichiometric excess in relation to the amino, thiol or hydroxyl groups of the polymer $Q_{PM}$.

The polyurethane prepolymer having isocyanate end groups is preferably elastic in nature. It preferably exhibits a glass transition temperature Tg of less than 0° C.

The toughness improver D may be a liquid rubber D2. This may be, for example, a carboxyl-terminated or epoxide-terminated polymer.

In a first embodiment, this liquid rubber may be a carboxyl- or epoxide-terminated acrylonitrile/butadiene copolymer or a derivative thereof. Liquid rubbers of this kind are available commercially, for example, under the name Hypro/Hypox® CTBN and CTBNX and ETBN from Emerald Performance Materials. Suitable derivatives are, in particular, elastomer-modified prepolymers containing epoxide groups, of the kind marketed commercially under the product line Polydis®, especially from the product line Polydis® 36., by the company Struktol® (Schill+Seilacher Group, Germany), or under the product line Albipox (Evonik, Germany).

In a second embodiment, this liquid rubber may be a polyacrylate liquid rubber, which is fully miscible with liquid epoxy resins and which separates only when the epoxy resin matrix is cured, to form microdroplets. Liquid polyacrylate rubbers of this kind are available, for example, under the designation 20208-XPA from Dow.

It is of course also possible to use mixtures of liquid rubbers, more particularly mixtures of carboxyl- or epoxide-terminated acrylonitrile/butadiene copolymers or of derivatives thereof.

The toughness improver D in a third embodiment may be a core-shell polymer D3. Core-shell polymers consist of an elastic core polymer and a rigid shell polymer. Particularly suitable core-shell polymers are composed of a core of elastic acrylate polymer or butadiene polymer, surrounded by a rigid shell of a rigid thermoplastic polymer. This core-shell structure either forms spontaneously by separation of a block copolymer, or is dictated by the polymerization regime as latex or suspension polymerization with subsequent grafting. Preferred core-shell polymers are those known as MBS polymers, which are available commercially under the trade name Clearstrength™ from Arkema, Paraloid™ from Dow or F-351™ from Zeon.

With particular preference the one-component thermosetting epoxy resin adhesive comprises not only terminally blocked polyurethane polymers D1 but also liquid rubbers D2.

The fraction of toughness improver D is preferably from 5-30 wt %, 7-25 wt %, 10-20 w t%, more preferably 10-15 wt %, based on the total weight of the epoxy resin adhesive.

In one preferred embodiment, the one-component thermosetting epoxy resin adhesive further comprises at least one filler F. Preference here is given to mica, talc, kaolin, wollastonite, feldspar, syenite, chlorite, bentonite, montmorillonite, calcium carbonate (precipitated or ground), dolomite, quartz, silicas (fumed or precipitated), cristobalite, calcium oxide, aluminium hydroxide, magnesium oxide, hollow ceramic beads, hollow glass beads, hollow organic beads, glass beads, colour pigments. Particularly preferred are fillers selected from the group consisting of calcium carbonate, calcium oxide and fumed silicas.

The total fraction of the overall filler F is advantageously 5-40 weight %, preferably 20-40 weight %, based on the total weight of the epoxy resin adhesive.

The one-component thermosetting epoxy resin adhesive may comprise further constituents, especially catalysts, stabilizers, particularly heat and/or light stabilizers, thixotropic agents, plasticizers, solvents, dyes and pigments, corrosion inhibitors, surfactants, defoamers and adhesion promoters.

In one preferred embodiment, the one-component thermosetting epoxy resin adhesive comprises a physical or chemical blowing agent. Such blowing agents are available for example as Expancel™ from Akzo Nobel or Celogen™ from Chemtura. The fraction of the blowing agent, where used, is for example 0.1 to 3 wt %, based on the weight of the one-component thermosetting epoxy resin adhesive.

A particularly preferred thermosetting one-component epoxy resin adhesive comprises:
- 5-40 wt %, 10-35 wt %, 15-35 wt %, more preferably 20-30 wt %, based on the total weight of the one-component thermosetting epoxy resin adhesive, of a liquid epoxy resin;
- 5-30 wt %, 5-25 wt %, 5-20 wt %, more preferably 10-15 wt %, based on the total weight of the one-component thermosetting epoxy resin adhesive, of a solid epoxy resin;
- 1-8 wt %, more particularly 2-6 wt %, based on the total weight of the one-component thermosetting epoxy resin adhesive, of at least one latent hardener for epoxy resins, more particularly dicyandiamide;
- 2 to 13 mmol, 2.5 to 10.5 mmol, 2.5 to 8.5 mmol, 2.5 to 6 mmol, more preferably 3 to 5 mmol, of the at least one carboxylic acid per 100 g of epoxy resin adhesive, the at least one carboxylic acid being selected from succinic acid and phthalic anhydride;
- 5-30 wt %, 7-25 wt %, 10-20 wt %, more preferably 10-15 wt %, based on the total weight of the epoxy resin adhesive, of at least one toughness improver D, selected from the group consisting of terminally blocked polyurethane polymers D1 and liquid rubbers D2;
- preferably 0.1 to 3 wt %, based on the weight of the one-component thermosetting epoxy resin adhesive, of a physical of chemical blowing agent;
- preferably 5-40 weight %, preferably 20-40 weight %, based on the total weight of the epoxy resin composition, of a filler F selected from the group consisting of calcium carbonate, calcium oxide and fumed silicas.

It may further be advantageous if the preferred one-component thermosetting epoxy resin adhesive consists to an extent of more than 80 weight %, preferably more than 90 weight %, more particularly more than 95 weight %, especially preferably more than 98 weight %, most preferably more than 99 weight %, based on the total weight of the epoxy resin adhesive, of the aforementioned constituents.

The one-component thermosetting epoxy resin adhesive has a viscosity of more than 10 000 Pas at 25° C., more particularly more than 15 000 Pas at 25° C. With particular preference the viscosity at 25° C. has a value of more than 25 000 Pas. Most preferably the epoxy resin adhesive is solid at 25° C.

It is further preferred if the one-component thermosetting epoxy resin adhesive has a viscosity of more than 5000 Pas at 60° C., more particularly more than 8000 Pas at 60° C.

The viscosity here is measured oscillographically by means of a rheometer with heatable plate (MCR 301, AntonPaar) (gap 1000 μm, measuring plate diameter: 25 mm (plate/plate), deformation 0.01 at 5 Hz, temperature: 25° C.). In the case of measurements of the viscosity at 60° C., the measuring temperature, correspondingly, is 60° C.

The thermosetting epoxy resin adhesive is preferably substantially free from hydroxyalkylamide or hydroxyalkylurea H. A hydroxyalkylamide contains the chemical moiety of the formula (VI). A hydroxyalkylurea contains the chemical moiety of the formula (VII).

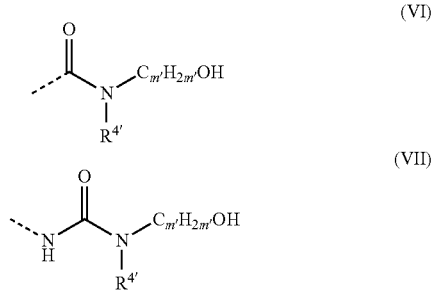

In these formulae, m' has a value of 2 to 6, more particularly of 2, and $R^{4'}$ is H or an alkyl group having 1 to 5 carbon atoms or is a hydroxyalkyl group of the formula $C_{m}H_{2m}OH$.

The term "substantially free" here refers to a fraction of less than 50% of the molar amount of the carboxylic acid, more particularly less than 20% of the molar amount of the carboxylic acid, preferably less than 10% of the molar amount of the carboxylic acid, most preferably less than 5% of the molar amount of the carboxylic acid, based on the total molar amount of the carboxylic acid in the one-component thermosetting epoxy resin adhesive.

Where the epoxy resin adhesive of the invention comprises an aforementioned carboxylic acid and a hydroxyalkylamide or hydroxyalkylurea H, these components may react with one another when the temperature is increased and may, through a condensation reaction, provide water, possibly leading to uncontrolled foaming of the cured epoxy resin adhesive.

Adhesives of this kind are needed for the bonding of heat-stable materials. By heat-stable materials are meant materials which are dimensionally stable, at least during the cure time, at a curing temperature of 100-220° C., preferably 120-200° C. They are, more particularly, metals and plastics such as ABS, polyamide, polyphenylene ethers, compounded materials such as SMC, unsaturated polyesters GRP and composite epoxide or acrylate materials. Particularly heat-stable plastics, furthermore, are polysulfones or polyethersulfones.

A preferred application is when at least one material is a metal. More particularly the metal is a metal which has been coated by cathodic electrocoating (CEC).

Considered a particularly preferred use is the adhesive bonding of identical or different metals, particularly in body construction within the automotive industry. The preferred metals are, in particular, steel, especially electrolytically galvanized, hot dip galvanized, oiled steel, Bonazinc-coated steel, and subsequently phosphated steel, and also aluminium, particularly in the versions typically encountered in car making.

An adhesive of this kind is more particularly first contacted with the materials to be bonded, at a temperature of between 10° C. and 80° C., more particularly between 10° C. and 60° C., and subsequently cured at a temperature of typically 100-220° C., preferably 120-200° C.

A further aspect of the present invention therefore relates to a method for adhesively bonding heat-stable substrates, comprising the steps of:
i) applying a thermosetting epoxy resin adhesive as described in detail above to the surface of a heat-stable substrate S1, more particularly of a metal;
ii) contacting the applied thermosetting epoxy resin adhesive with the surface of a further heat-stable substrate S2, more particularly of a metal;
iii) heating the thermosetting epoxy resin adhesive to a temperature of 100-220° C., more particularly of 120-200° C., preferably between 160 and 190° C.;
wherein the substrate S2 consists of the same material as or a different material to the substrate S1.

The heat-stable substrates S1 and S2 are more particularly the heat-stable materials already mentioned above.

A method of this kind for the bonding of heat-stable materials results in an article comprising a cured adhesively bonded assembly. An article of this kind is preferably a vehicle or a component for mounting in or on a vehicle.

Furthermore, the compositions of the invention are suitable not only for car making but also for other fields of application. Particularly noteworthy are related applications in the construction of means of transport such as ships, lorries, buses or rail vehicles, or in the construction of consumer goods such as washing machines, for example.

The materials bonded by means of a composition of the invention are employed at temperatures between typically 120° C. and −40° C., preferably between 100° C. and −40° C., more particularly between 80° C. and −40° C.

One particularly preferred use of the thermosetting epoxy resin adhesive of the invention is the use thereof as a thermosetting, more particularly foamable, body construction adhesive in vehicle construction.

A further particularly preferred use of the thermosetting epoxy resin adhesive of the invention is the use thereof for adhesively bonding or strengthening metal structures, or the strengthening filling of cavities in vehicle construction or sandwich panel construction. Particularly preferred is the use for the reinforcing filling of cavities in vehicle construction.

The thermosetting epoxy resin adhesive may in particular be applied to a support. Supports of this kind are made in particular of a heat-stable material of the kind already mentioned above as heat-stable substrates S1. In this case the thermosetting epoxy resin composition is applied in the melted state to the support means.

It is possible accordingly to realize, simply, reinforcing elements for the strengthening of metallic structures featuring a support on which an as-described thermosetting epoxy resin composition has been applied.

These reinforcing elements are fixed on the metallic structure to be reinforced, or fixed in a cavity of the metallic structure to be reinforced. Fixing may take place here by a fixing means such as by a clip, a screw, a hook, a rivet, a groove or an adhesive, or else by means of suitable geometry of the structure to enable clamping. It is therefore preferred for the support to have a fixing means of this kind. It is especially preferred if the structure to be reinforced has a counter-piece corresponding to the fixing means, such as, for example, a projecting edge/hook or screw/screw thread.

A further aspect of the present invention therefore relates to a cured epoxy resin adhesive which is obtained by the heating of a thermosetting epoxy resin adhesive, described in detail above, to a temperature of 100-220° C., preferably 120-200° C.

More particularly, a further aspect of the present invention relates to a structural foam which is obtained by heating from a thermosetting epoxy resin adhesive as already described.

The key properties of a structural foam are firstly that it is foamed on heating and secondly that it is capable, through the chemical curing of the composition, of transmitting large forces and therefore of strengthening a structure, typically a metallic structure. Structural foams of this kind are typically employed in cavities of metallic structures. They may in particular also be used as a constituent in the reinforcing elements described above.

They may be mounted, for example, in the cavities of supporting pillars of the body of a means of transport. The support holds this reinforcing element at the desired location. The reinforcing element is customarily introduced in body construction, i.e. during construction of the bodywork. After passing through a CEC bath, the bodywork enters a CEC oven, where the CEC coating material is baked at a temperature of typically 160 to 190° C. The steam which is formed at these temperatures results, as a blowing agent, in the formation of a foam, and the thermosetting composition reacts here chemically with crosslinking, leading to the curing of the adhesive.

These reinforcing elements are therefore frequently employed at locations in which it is in many cases difficult after assembly, owing to the shape and/or the narrow extent of such cavities, to carry out efficient reinforcing or sealing of such cavities or to insulate transmission of noise in such cavities.

By virtue of these structural foams it is possible to obtain high strengths and sealed structures in spite of lower weight. It is possible, moreover, to close off the interior from cavities, because of the filling and sealing function of the structural foam, and so to achieve a marked reduction in road noise and vibrations.

The invention further encompasses the use of at least one carboxylic acid selected from substituted or unsubstituted succinic acid and substituted or unsubstituted phthalic acid, as described, for increasing the tensile shear strength to ASTM D1002-10 on curing at 170° C. for 20 min and/or at 205° C. for 40 min, more particularly at 170° C. for 20 min, of a one-component thermosetting epoxy resin adhesive, more particularly of a thermosetting epoxy resin adhesive in vehicle construction and sandwich panel construction. This is preferably a thermosetting epoxy resin adhesive as described above. The increase in the tensile shear strength relates to a comparison with one-component thermosetting epoxy resin adhesives which do not contain any of the aforementioned carboxylic acids. The tensile shear strength is preferably determined by the method used in the Examples section. The nature and amount of the at least one carboxylic acid used are preferably as described above, and in particular the natures and amounts identified above as being preferred are also used with preference.

The invention is elucidated further in the text below by means of examples which, however, are not intended to restrict the invention in any way.

EXAMPLES

Test methods used for the testing of the respective properties in the examples were as follows:

Viscosity

The viscosity was measured oscillographically by means of a rheometer with heatable plate (MCR 301, AntonPaar) (gap 1000 µm, measuring plate diameter: 25 mm (plate/plate), deformation 0.01 at 5 Hz, temperature: 20° C.-70° C., heating rate 10° C./min).

Tensile Shear Strength (LSS)

The determination follows the general lines of ASTM D1002-10. The tensile shear strength was determined using the following set-up (dimensions in mm):

Test temperature: 23° C.

Bond area: 12.7 mm×25.4 mm

Adhesive layer thickness: 0.8 mm

Curing: 20 min at 170° C., or 40 min at 205° C.

Test velocity: 13 mm/min

Cohesive Facture/Adhesive Fracture (Fracture Mode)

Visual assessment of the fracture mode obtained from the tensile shear strength, divided into CF and AF. CF=cohesive fracture, AF=adhesive fracture.

Testing Examples

The base formulation used for epoxy resin adhesives was a formulation as described below.

Base Formulation:

| Raw material | wt % |
|---|---|
| Liquid epoxy resin of formula (II) with an index s smaller than 0.2 | 20 |
| Solid epoxy resin of formula (II) with an index s from 2 to 12 | 15 |
| Dicyandiamide | 3 |
| Terminally blocked polyurethane polymer D1 of formula (I) | 10 |
| Liquid rubber D2 | 10 |
| Blowing agent | 0.1 |
| Drying agent | 3 |
| Filler mixture of calcium carbonate, calcium oxide and fumed silica | 38.9 |

Added to the base formulation in each case was a carboxylic acid in a defined fraction as recited in Table 1 below (amounts in mmol acid/100 g epoxy resin adhesive). As a reference, the base formulation was tested without addition of carboxylic acid (Ref1 and Ref2). Moreover, as a non-inventive carboxylic acid, 1-[2-(isopropenylcarbonyloxy)ethyl] succinate was used (Ref3 and Ref4). The substrate used for the adhesion testing was oiled steel sheet and, respectively, aluminium.

| Steel (HDG) oiled | DC06 + ZE 75/75 APO | Electrolytically galvanized steel sheet, oiled |
|---|---|---|
| Aluminium | Aluminium alloy 6061 | Aluminium alloy |

The results of the measurements of the tensile shear strength (LSS) and also of the fracture mode are likewise recited in Table 1. From these results it is apparent that the compositions without carboxylic acid exhibit significantly lower levels of tensile shear strength. Also in evidence is an adhesive fracture mode on the aluminium substrate at both curing temperatures.

Moreover, 1-[2-(isopropenylcarbonyloxy)ethyl] succinate, as a monoester of (2-hydroxyethyl) methacrylate (HEMA) and succinic acid, proves to be a negative example of a non-inventive carboxylic acid (Ref3 and Ref4). These compositions as well exhibit significantly lower levels of tensile shear strength.

All the compositions Ref1-Ref4 and also Ex1-Ex6 were solid at 25° C. and therefore had a viscosity at 25° C. of more than 25 000 Pas. The viscosity at 60° C. was 10 000 Pas.

TABLE 1

| Experiment | Substrate | Carboxylic acid | mmol* | LSS (20'@170° C.) | LSS (40'@205° C.) | Fracture mode | Brown discolorations** |
|---|---|---|---|---|---|---|---|
| Ref 1 | Steel oiled (HDG) | No acid | — | 7.2 MPa | 4.2 MPa | CF/AF | none |
| Ex 1 | Steel oiled (HDG) | Succinic acid | 4.2 | 10.6 MPa | 9.0 MPa | CF/CF | very few |
| Ex 2 | Steel oiled (HDG) | Phthalic anhydride | 3.4 | 9.6 MPa | 8.1 MPa | CF/CF | none |
| Ex 3 | Steel oiled (HDG) | Succinic acid | 8.4 | 10.0 MPa | *8.0 MPa | CF/CF | few |
| Ex 4 | Steel oiled (HDG) | Succinic acid | 12.6 | 8.9 MPa | **7.5 MPa | CF/AF | many |
| Ref 2 | Aluminium | No acid | — | 4.4 MPa | 3.1 MPa | AF/AF | none |
| Ex 5 | Aluminium | Succinic acid | 4.2 | 9.1 MPa | 9.1 MPa | CF/CF | very few |
| Ref 3 | Aluminium | 1-[2-(Isopropenylcarbonyloxy)ethyl] succinate | 2.2 | 6.4 MPa | 6.5 MPa | CF/AF | none |
| Ref 4 | Aluminium | 1-[2-(Isopropenylcarbonyloxy)ethyl] succinate | 4.4 | 6.6 MPa | 5.2 MPa | CF/AF | none |
| Ex 6 | Aluminium | Phthalic anhydride | 3.4 | 8.4 MPa | 7.4 MPa | CF/CF | none |

*mmol carboxylic acid per 100 g epoxy resin adhesive,
**brown dot-like discolorations on the cured adhesive.

The invention claimed is:

1. A one-component thermosetting epoxy resin adhesive, comprising
    at least one epoxy resin A having on average more than one epoxide group per molecule;
    at least one latent hardener for epoxy resins;
    at least one toughness improver D, a fraction of the at least one toughness improver D being in a range of from 5 to 30 wt %, based on a total weight of the one-component thermosetting epoxy resin adhesive; and
    at least one carboxylic acid selected from substituted or unsubstituted succinic acid and substituted or unsubstituted phthalic acid,
    wherein
    the one-component thermosetting epoxy resin adhesive contains 1.7 to 15 mmol of the at least one carboxylic acid per 100 g of epoxy resin adhesive, and
    the one-component thermosetting epoxy resin adhesive has a viscosity of more than 10 000 Pas at 25° C., the viscosity being determined oscillographically by means of a rheometer with heatable plate (MCR 301, AntonPaar) (gap 1000 μm, measuring plate diameter: 25 mm (plate/plate), deformation 0.01 at 5 Hz, temperature: 25° C.).

2. The one-component thermosetting epoxy resin adhesive according to claim 1, wherein the at least one carboxylic acid is selected from succinic acid and phthalic anhydride.

3. The one-component thermosetting epoxy resin adhesive according to claim 1, wherein the one-component thermosetting epoxy resin adhesive contains 2 to 13 mmol of the at least one carboxylic acid per 100 g of the one-component thermosetting epoxy resin adhesive.

4. The one-component thermosetting epoxy resin adhesive according to claim 1, wherein a fraction of the at least one epoxy resin A having on average more than one epoxide group per molecule is in a range of from 25 to 70 wt %, based on the total weight of the one-component thermosetting epoxy resin adhesive.

5. The one-component thermosetting epoxy resin adhesive according to claim 1, wherein the at least one latent hardener is selected from the group consisting of dicyandiamide, guanamines, guanidines, aminoguanidines and derivatives thereof, substituted ureas, imidazoles, and amine complexes.

6. The one-component thermosetting epoxy resin adhesive according to claim 1, wherein the one-component thermosetting epoxy resin adhesive has a viscosity of more than 15 000 Pas at 25° C., the viscosity being determined oscillographically by means of a rheometer with heatable plate (MCR 301, AntonPaar) (gap 1000 μm, measuring plate diameter: 25 mm (plate/plate), deformation 0.01 at 5 Hz, temperature: 25° C.).

7. The one-component thermosetting epoxy resin adhesive according to claim 1, further comprising at least one physical or chemical blowing agent.

8. A method for adhesively bonding heat-stable substrates, comprising the steps of
    i) applying the one-component thermosetting epoxy resin adhesive according to claim 1 to a surface of a heat-stable substrate S1;
    ii) contacting the applied one-component thermosetting epoxy resin adhesive with a surface of a further heat-stable substrate S2;
    iii) heating the one-component thermosetting epoxy resin adhesive to a temperature of 100-220° C.;
    wherein the substrate S2 consists of the same material as or a different material to the substrate S1.

9. A method comprising applying the one-component thermosetting epoxy resin adhesive according to claim 1 to adhesively bond or strengthen metal structures or to strengthen filling of cavities in vehicle construction or sandwich panel construction.

10. A method comprising mixing a one-component thermosetting epoxy resin adhesive with at least one carboxylic acid selected from substituted or unsubstituted succinic acid and substituted or unsubstituted phthalic acid to improve tensile shear strength of the one-component thermosetting epoxy resin adhesive on curing at 170° C. for 20 min and/or at 205° C. for 40 min, wherein
    the one-component thermosetting epoxy resin adhesive comprises:
        at least one epoxy resin A having on average more than one epoxide group per molecule;
        at least one toughness improver D, a fraction of the at least one toughness improver D being in a range of from 5 to 30 wt %, based on a total weight of the one-component thermosetting epoxy resin adhesive; and
        at least one latent hardener for epoxy resins;

where
an amount of the at least one carboxylic acid is in a range of from 1.7 to 15 mmol per 100 g of the one-component thermosetting epoxy resin adhesive, and
the one-component thermosetting epoxy resin adhesive has a viscosity of more than 10 000 Pas at 25° C., the viscosity being determined oscillographically by means of a rheometer with heatable plate (MCR 301, Anton-Paar) (gap 1000 µm, measuring plate diameter: 25 mm (plate/plate), deformation 0.01 at 5 Hz, temperature: 25° C.), and
the tensile strength is measured according to ASTM D1002-10.

11. A structural foam obtained by heating the one-component thermosetting epoxy resin adhesive according to claim 1.

12. An article comprising a cured adhesively bonded assembly, the adhesively bonded assembly being obtained by the method according to claim 8.

13. The one-component thermosetting epoxy resin adhesive according to claim 1, wherein the one-component thermosetting epoxy resin adhesive is a solid at 25° C.

14. The one-component thermosetting epoxy resin adhesive according to claim 1, wherein the at least one carboxylic acid is phthalic anhydride.

15. The one-component thermosetting epoxy resin adhesive according to claim 1, wherein the at least one toughness improver D is selected from the group consisting of a terminally blocked polyurethane polymer, a liquid rubber, and a core-shell polymer.

16. The one-component thermosetting epoxy resin adhesive according to claim 1, wherein a fraction of the at least one epoxy resin A having on average more than one epoxide group per molecule is in a range of from 30 to 55 wt %, based on the total weight of the one-component thermosetting epoxy resin adhesive.

* * * * *